United States Patent
Horan et al.

(10) Patent No.: US 10,735,545 B2
(45) Date of Patent: Aug. 4, 2020

(54) ROUTING VAULT ACCESS REQUESTS IN A DISPERSED STORAGE NETWORK

(71) Applicant: International Business Machines Corporation, Armonk, NY (US)

(72) Inventors: Scott M. Horan, Clarendon Hills, IL (US); Wesley B. Leggette, Chicago, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 737 days.

(21) Appl. No.: 15/174,279

(22) Filed: Jun. 6, 2016

(65) Prior Publication Data
US 2017/0353580 A1 Dec. 7, 2017

(51) Int. Cl.
*G06F 15/16* (2006.01)
*H04L 29/08* (2006.01)
(Continued)

(52) U.S. Cl.
CPC .......... *H04L 67/2842* (2013.01); *G06F 3/061* (2013.01); *G06F 3/067* (2013.01);
(Continued)

(58) Field of Classification Search
CPC . H04L 67/1008; H04L 67/1097; H04L 45/00; H04L 67/2842; G06F 9/46; G06F 9/00; G06F 3/06
(Continued)

(56) References Cited

U.S. PATENT DOCUMENTS 4,092,732 A  5/1978 Ouchi
5,454,101 A  9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Oscar A Louie
*Assistant Examiner* — Oluwatosin M Gidado
(74) *Attorney, Agent, or Firm* — James Nock; Andrew D. Wright; Roberts Calderon Safran & Cole, P.C.

(57) ABSTRACT

A method for execution by a dispersed storage and task (DST) execution unit that includes a processor includes receiving a vault access request indicating a first one of a plurality of vaults. Processing unit options data that indicates a set of DST processing units is generated based on an access cache that includes a plurality of access entries, where each DST processing unit in the set of DST processing units is indicated in a first one of the plurality of access entries, and where the first one of the plurality of access entries further indicates the first one of the plurality of vaults. A DST processing unit is selected from the set of DST processing units to execute the vault access request based on the processing unit options data. An instruction that includes the vault access request is generated for transmission to the first DST processing unit. A new access entry that includes a vault identifier indicating the first one of the plurality of vaults indicated by the vault access request and a processor identifier indicating the first DST processing unit is generated. The access cache is updated by adding the new access entry to the access cache.

20 Claims, 5 Drawing Sheets

(51) Int. Cl.
  *G06F 9/46* (2006.01)
  *G06F 3/06* (2006.01)
(52) U.S. Cl.
  CPC .............. *G06F 3/0659* (2013.01); *G06F 9/46* (2013.01); *H04L 67/1097* (2013.01); *H04L 67/1008* (2013.01)
(58) Field of Classification Search
  USPC ........................................................ 709/225
  See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 9,846,655 | B1* | 12/2017 | Zhao .................. G06F 13/14 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2003/0225892 | A1* | 12/2003 | Takusagawa ..... H04L 29/12311 709/227 |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2013/0073669 | A1* | 3/2013 | Roberts ............. H04L 29/08306 709/214 |
| 2013/0298117 | A1* | 11/2013 | Reynolds .............. H04L 41/082 717/173 |
| 2014/0282579 | A1* | 9/2014 | Smiley .................. G06F 9/5027 718/104 |
| 2015/0067421 | A1* | 3/2015 | Baptist ................ H04L 67/1097 714/723 |
| 2016/0335202 | A1* | 11/2016 | Grube ................. G06F 16/1827 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

(56) References Cited

OTHER PUBLICATIONS

Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

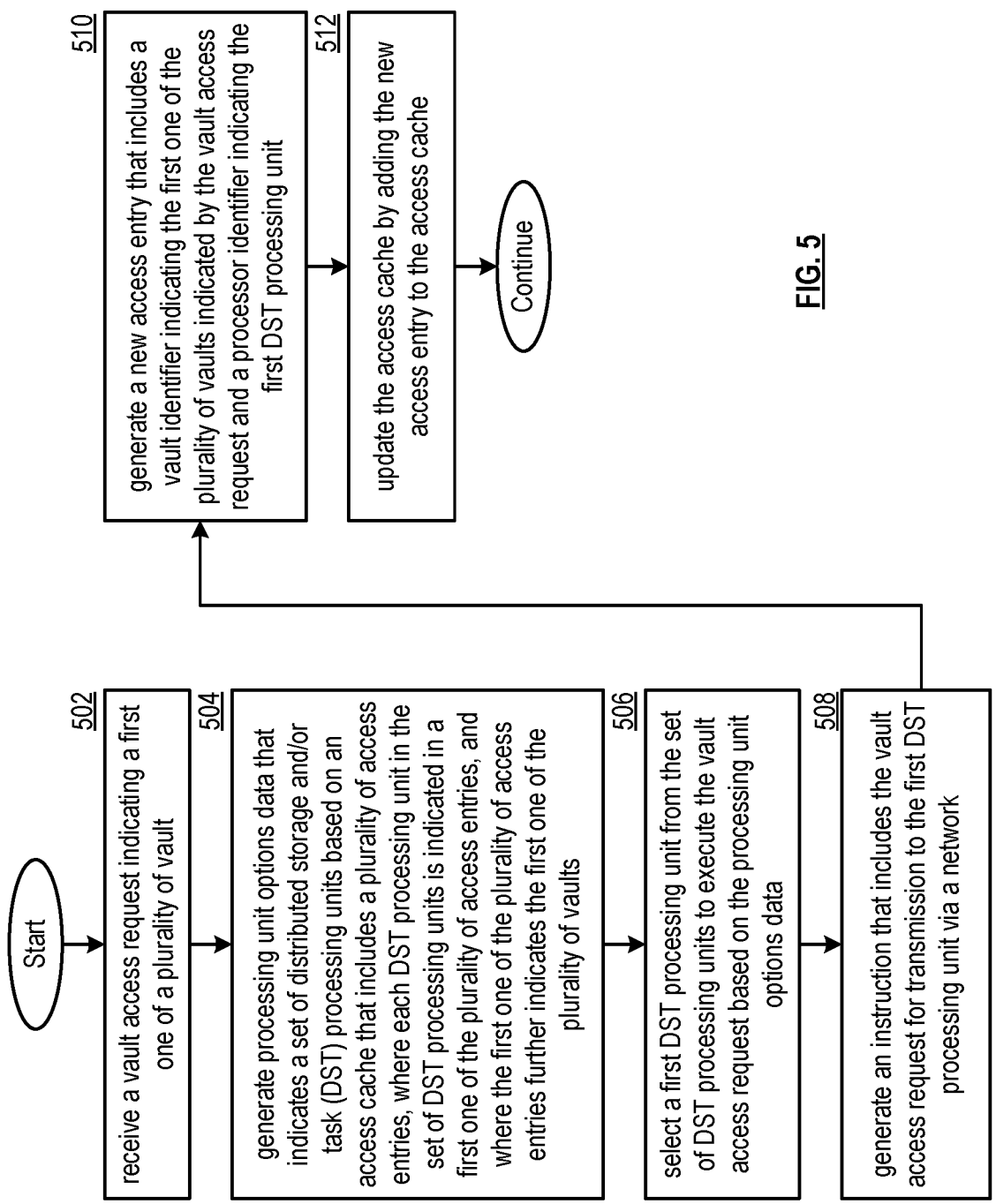

ROUTING VAULT ACCESS REQUESTS IN A DISPERSED STORAGE NETWORK

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not applicable.

BACKGROUND OF THE INVENTION

Technical Field of the Invention

Aspects of this invention relate generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 5 is a flowchart illustrating an example of routing vault access requests in accordance with the present invention.

DETAILED DESCRIPTION OF THE INVENTION

Figure 1:
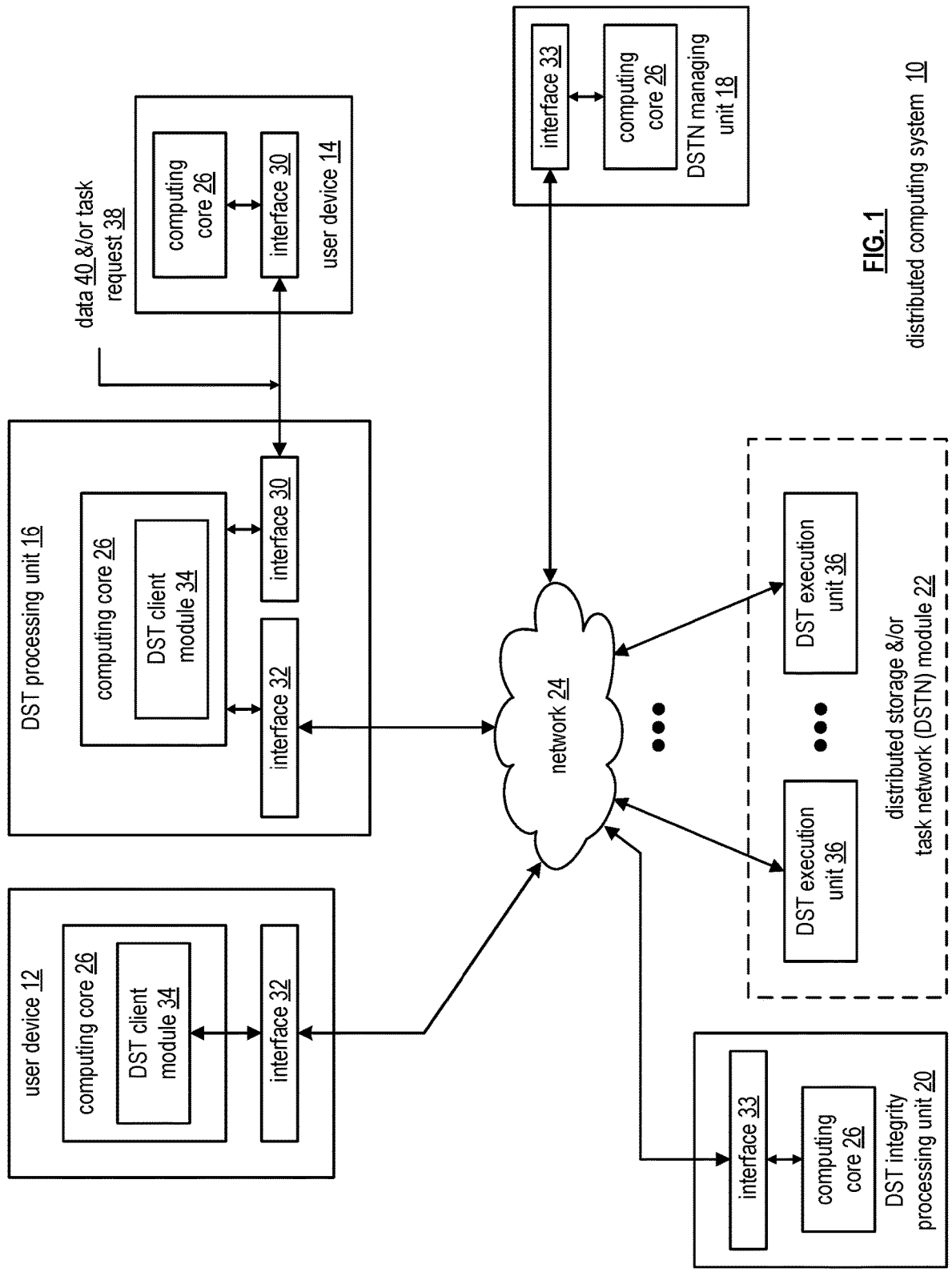
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public interne systems; and/or one or more local area networks (LAN) and/or wide area networks (WAN). Hereafter, the distributed computing system 10 may be interchangeably referred to as a dispersed storage network (DSN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, the DST execution unit may be interchangeably referred to as a storage unit and a set of DST execution units may be interchangeably referred to as a set of storage units.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34. While only one DST processing unit 16 is depicted in FIG. 1, the DSN can include a plurality of DST processing units 16, all connected to network 24.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval, and data storage integrity verification. In accordance with these three primary functions, data can be encoded (e.g., utilizing an information dispersal algorithm (IDA), utilizing a dispersed storage error encoding process), distributedly stored in physically different locations, and subsequently retrieved in a reliable and secure manner. Hereafter, distributedly stored may be interchangeably referred to as dispersed stored. Such a system is tolerant of a significant number of failures (e.g., up to a failure level, which may be greater than or equal to a pillar width (e.g., an IDA width of the IDA) minus a decode threshold minus one) that may result from individual storage device (e.g., DST execution unit 36) failures and/or network equipment failures without loss of data and without the need for a redundant or backup copy. Further, the distributed computing system 10 allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block associated with a portion of an overall namespace of the DSN) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated system registry information in one or more of the DSTN module 22, the user device 12, the DST processing unit 16, and the DST integrity processing unit 20.

The DS error encoding parameters (e.g., or dispersed storage error coding parameters for encoding and decoding) include data segmenting information (e.g., how many segments data (e.g., a file, a group of files, a data block, etc.) is divided into), segment security information (e.g., per segment encryption, compression, integrity checksum, etc.), error coding information (e.g., pillar/IDA width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

In various embodiments with multiple DST processing units 16, another DS management service includes the DSTN managing unit 18 routing vault access requests to one or more of the DST processing units 16. For example, the DSTN managing unit can route the request to a particular DST processing unit based on a vault or DST execution unit identified in the request and/or based on performance and/or capacity constraints. The DSTN managing unit 18 can receive the access request, for example, via an interface of one of the user devices 12-14, determine which DST processing unit will handle the request, and send the request to the selected DST processing unit. The DSTN managing unit can receive a response and/or slice from the DST processing unit after the access request has been performed, and can send this response and/or slice to the user device 12-14 accordingly.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

Each slice name is unique to a corresponding encoded data slice and includes multiple fields associated with the overall namespace of the DSN. For example, the fields may include a pillar number/pillar index, a vault identifier, an object number uniquely associated with a particular file for storage, and a data segment identifier of a plurality of data segments, where the particular file is divided into the plurality of data segments. For example, each slice name of a set of slice names corresponding to a set of encoded data slices that has been dispersed storage error encoded from a common data segment varies only by entries of the pillar number field as each share a common vault identifier, a common object number, and a common data segment identifier.

To support distributed task processing on received data, the distributed computing system 10 has two primary operations: DST (distributed storage and/or task processing) management and DST execution on received data. With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. With respect to the DST management, it is substantially similar to the DST management to support distributed task processing on received data.

Figure 2:
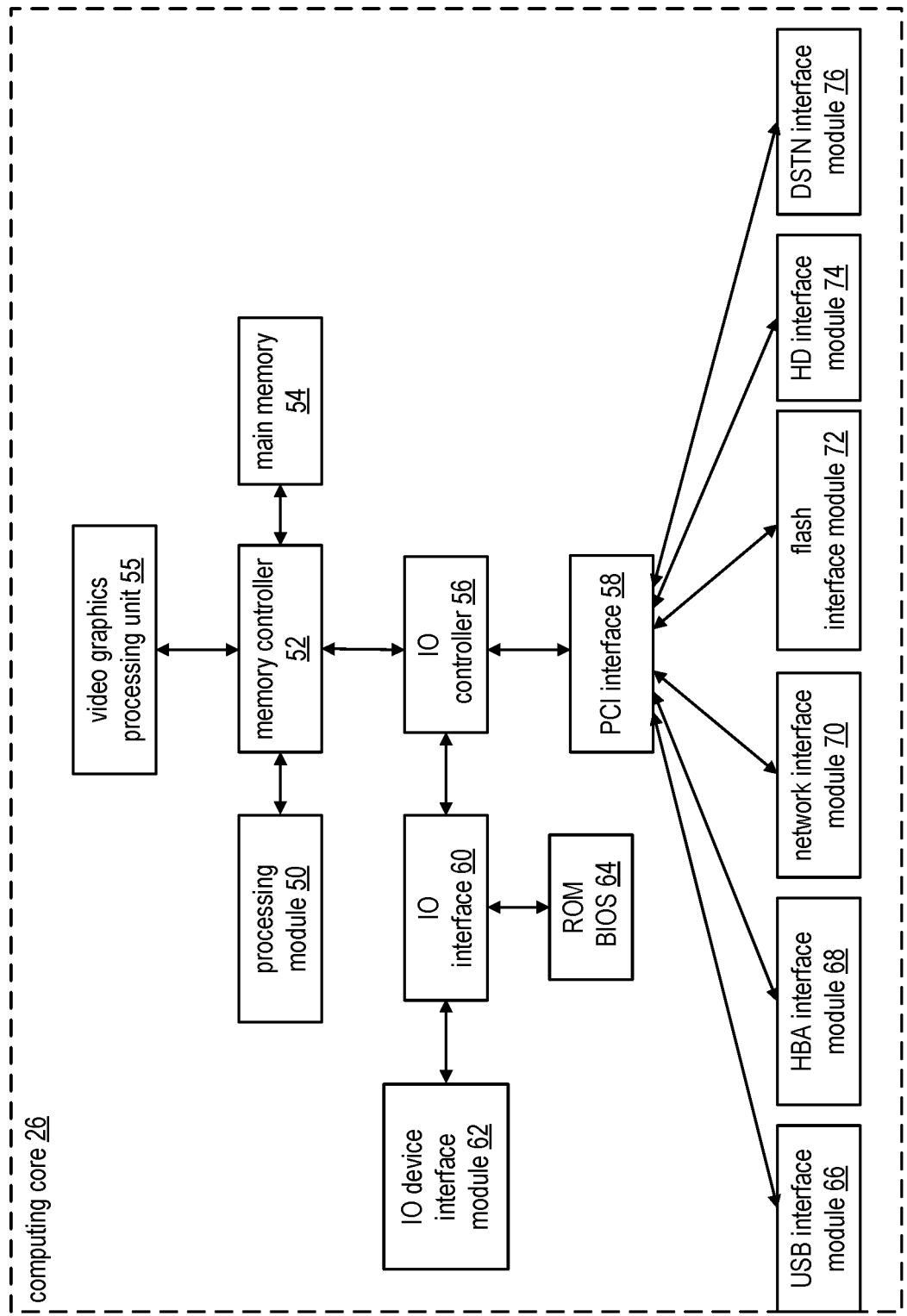
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), interne small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
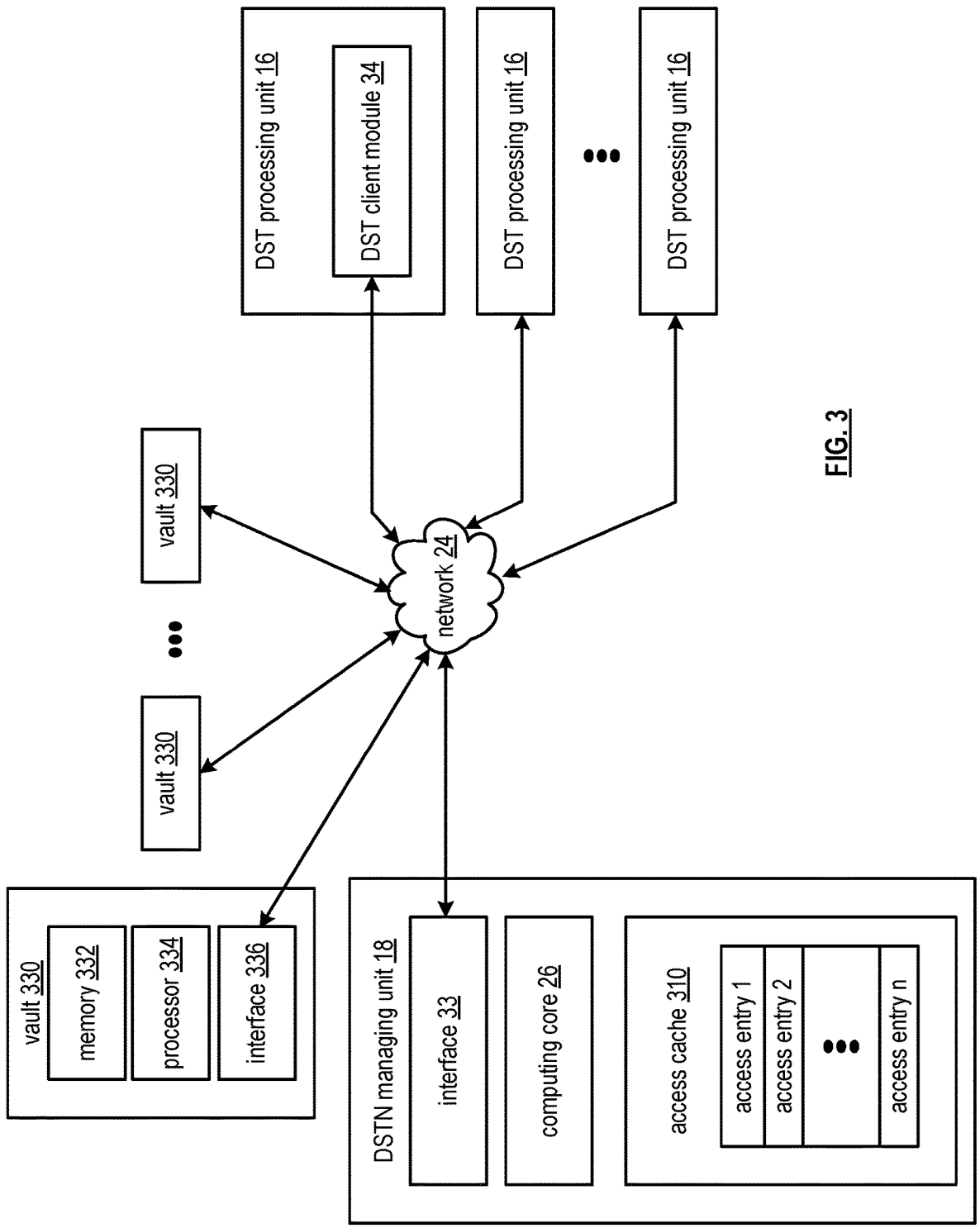
FIG. 3 is a schematic block diagrams of an embodiment of a dispersed storage network (DSN) in accordance with the present invention.

FIG. 3 is a schematic block diagram of another embodiment of a dispersed storage network (DSN) that includes a plurality of distributed storage and task (DST) processing units 16 of FIG. 1, the network 24 of FIG. 1, the DST managing unit 18 of FIG. 1, and a plurality of vaults 1-n. The DST managing unit 18 includes the interface 33 of FIG. 1, the computing core 26 of FIG. 1, and an access cache 310, which includes a plurality of access entries 1-n. Each of the plurality of DST processing units 16 include the DST client module 34 of FIG. 1. Each vault includes a memory 332, a processor 334, and an interface 336. In various embodiments, each vault can be implemented utilizing the DST execution unit 36 of FIG. 1. The memory 332 can be implemented utilizing main memory 54 of FIG. 2, the processor 334 can be implemented utilizing processing module 50 of FIG. 2, and the interface 336 can be implemented utilizing the client module 34 of FIG. 1. the The DSN functions to route vault access requests.

In a DSN memory with a significant number of vaults (or other logical containers), individual DST processing units may not have the resources to maintain knowledge of every vault's metadata necessary to efficiently service access requests to it. The vault's metadata can include namespace ranges, permissions and access controls, quotas, and/or associated storage pools.

In various embodiments, when a DST processing unit is not able to maintain all this metadata simultaneously, it may instead have to swap them out. For example, when access requests for a vault have not been received for some period of time, the DST processing unit can discard the corresponding metadata from active memory, remove it from cache, or store it elsewhere.

Later, when new access requests arrive for a vault for which the vault's metadata is not immediately available, the DST processing unit can load, retrieve, or cache the vault metadata in order to process the requests. The process of cycling vault metadata in and out wastes time and resources, and can add significant delay to the processing of access requests. To limit the effect, DST processing units may temporarily, if not permanently, be selected discriminately according to which vaults it has already recently processed requests for. This not only reduces the frequency of loading vault metadata, but also the amount of memory dedicated to storing vault metadata by the ds processing unit, as well as the number of DST units that might by impacted as well. In a system with billions of vaults, for example, only the minimum number of DST processing units will be aware of any particular vault, and only the minimum number needed to meet the performance demands of access requests to that vault. If 90% of the billions of vaults are inactive at any particular time, no memory or resources are wasted by DST processing units having to hold their metadata in active memory.

In various embodiments, a requester to a DST processing unit or pool of DST processing units, such as a load balancer, can maintain a cache that can include a plurality of access entries that each indicate a DST processing unit and a vault. In various embodiments, this requestor can be implemented utilizing DSTN managing unit 18 of FIG. 1, and this cache can be implemented utilizing the access cache 310 of FIG. 3. The DST processing unit and vault indicated by each access entry can be stored as a pair indicating a particular vault and a particular DST processing unit that accessed the vault, referred to hereafter as a (vault, DST processing unit) pair. In various embodiments, access entries can also include a time stamp indicating an access time. In various embodiments, the cache can maintain these access entries as an ordered list based on the access times. In various embodiments, the cache can include an entry for every possible (vault, DST processing unit) pair with a list of access times associated with this pair, the most recent access time associated with this pair, and/or an empty access time or a null value to indicate that the particular vault has either never been accessed by the DST processing unit or that the particular vault has not been accessed by the DST processing unit recently. In other embodiments, a (vault, DST processing unit) pair can be included in multiple access entries, corresponding to multiple accesses to the vault by the DST processing unit at different times.

In various embodiments, the cache can instead maintain only a subset of all possible (vault, DST processing unit) pairs. The pairs included in this subset can be, for example, based on pairs with the most recent access times. In this fashion, the cache can maintain a fixed size, removing access entries with the least recent (vault, DST processing unit) pairs. In other embodiments, the cache can maintain a variable number of access entries, and the subset instead only includes pairs with a corresponding access time that is more recent than a predetermined cutoff time, where the requestor removes entries with time stamps older than the cutoff time from the cache. In some embodiments, a particular (vault, DST processing unit) pair will only be included in one access entry of the cache, and can include a most recent access time stamp or a list of recent access time stamps up to a certain cutoff time. In some embodiments, frequency of access can also be considered, and the subset of access entries stored by the cache will only include entries that include at least a certain number of recent access times to maintain only the list of particular vaults accessed by particular DST processing units both recently and frequently. In some embodiments, the subset of access entries stored by the cache will only include one, or a fixed number, of entries corresponding to a particular vault. For example, the requestor can choose to store access entries that indicate only the three most recent accesses to a particular vault, and therefore maintains a list of up to three processing units for a particular vault. The fixed number can be the same for every vault, or different for various vaults based on factors such as performance and/or capacity. This embodiment might be ideal in some DSNs to help ensure that the number of DST processing units that need to maintain a particular vault's metadata is kept to a minimum. In various embodiments, the subset of access entries stored by the cache will only include one, or a fixed number, of entries corresponding to a particular DST processing unit. For example, the requestor can choose to store only access entries that indicate only the five most recent vaults accessed by a particular DST processing unit. This embodiment may be ideal in some DSNs to allow a wider of variety of DST processing units to be used for different vault accesses, and help ensure that access requests are not all being performed by a small subset of DST processing units.

The requestor can receive a vault access request indicating a particular vault to be accessed. The access request can include a read or write request, a request to perform a function and/or process on stored data, or another request directed to data stored in a particular vault. The access request can include a slice access request to read, write, and/or perform a function and/or process on an encoded data slice. The access request can also include an identifier that indicates a particular vault. In other embodiments, a particular vault corresponding to the request can be determined based on the request by utilizing, for example, a hash function and/or lookup table. In various embodiments, when deciding which DST processing unit to route a vault access request to, the requester can first attempt to identify all DST processing units that have served an access request for this vault based on the access entries of the cache of the requestor. The requestor can determine a set of possible DST processing unit options based on access entries in the cache that include the vault indicated in the vault access request.

The requestor can select a particular DST processing unit from the set of possible DST processing unit options to execute the vault access request. In various embodiments, the particular DST processing unit can be selected based on access time. For example, the set of possible DST processing unit options can be ranked by access time. All DST processing units for which the difference between the current time and the last access time is within some time threshold then are up for consideration. In various embodiments, if no DST processing units are up for consideration, a new DST processing unit can be chosen at random from among the set of all DST processing units or in accordance with a digital array processor (DAP) strategy or round-robin strategy. In some embodiments, if at least one DST processing unit is up for consideration the DST processing unit with the most recent access time will be selected. In other embodiments, DST processing units up for consideration can be used as the pool from which a selection of a DST processing unit will be made. However, before a final selection is made, the set of DST processing units for consideration may be further narrowed by a performance/capacity consideration. That is, of the set of considered DST processing units, which of these have the spare capacity/performance/capability to service this request. If none are left after this filter is applied, then again another DST processing unit can be chosen at random, according to a DAP strategy, or round-robin strategy from the set of all DST processing units that have the capacity/performance/capability to service the request. Otherwise, the narrowed set of DST processing units can be used to make a selection using a random, DAP, or round-robin strategy.

Once a DST processing unit is selected to process the vault access request, the requestor will send the access request to the selected DST processing unit. The requestor can update the cache to reflect this access by adding a new entry to the cache with the corresponding DST processing unit and vault, or update an existing access entry containing the (vault, DST processing unit) pair by updating the time stamp to reflect this most recent access time, or add this access time to a list of recent access times in the access entry corresponding to this pair. In some embodiments, a less recent access entry corresponding to a different (vault, DST processing unit) pair can be removed in response to adding this more recent access entry. In particular, in some embodiments, an old access entry corresponding to the same DST processing unit may be removed when the new access entry indicting this DST processing unit is added. In other embodiments, an old access entry corresponding to the same vault may be removed when the new access entry indicating this vault is added.

In various embodiments, a processing system of a DSTN managing unit includes at least one processor and a memory that stores operational instructions, that when executed by the at least one processor cause the processing system to receive a vault access request indicating a first one of a plurality of vaults. Processing unit options data that indicates a set of DST processing units is generated based on an access cache that includes a plurality of access entries, where each DST processing unit in the set of DST processing units is indicated in a first one of the plurality of access entries, and where the first one of the plurality of access entries further indicates the first one of the plurality of vaults. A DST processing unit is selected from the set of DST processing units to execute the vault access request based on the processing unit options data. An instruction that includes the vault access request is generated for transmission to the first DST processing unit. A new access entry that includes a vault identifier indicating the first one of the plurality of vaults indicated by the vault access request and a processor identifier indicating the first DST processing unit is generated. The access cache is updated by adding the new access entry to the access cache.

In various embodiments, the processing unit options data further includes time data indicated by the access cache, and the selecting the first DST processing unit is further based on the time data. In various embodiments, the time data includes a plurality of access time stamps corresponding to each DST processing unit in the set of DST processing units, and the first DST processing unit corresponds to a most recent time stamp. In various embodiments, the processing unit options data further indicates performance data and/or capacity data corresponding to each DST processing unit in the set of DST processing units, and selection of the first DST processing unit is further based on the performance data and/or the capacity data. In various embodiments, the first DST processing unit is selected by performing one of: a digital array processor (DAP) method or a round-robin method on the set of DST processing units.

In various embodiments, the operational instructions, when executed by the at least one processor, further cause the processing system to generating old access entry data. A second one of the plurality of access entries is selected from the access cache based on the old access entry data. The second one of the plurality of access entries is removed from the access cache. In various embodiments, the old access entry data is generated by determining a count of access entries in the access cache and comparing the count to a predefined threshold, and wherein the second one of the plurality of access entries is removed from the access cache when the old access entry data indicates that the count is greater than the predefined threshold. In various embodiments, the old access entry data is generated by comparing an access time stamp indicated by a one of the plurality of access entries to an expiration time, and wherein the second one of the plurality of access entries is removed from the access cache when the old access entry data indicates that the access time stamp is older than the expiration time.

Figure 4:
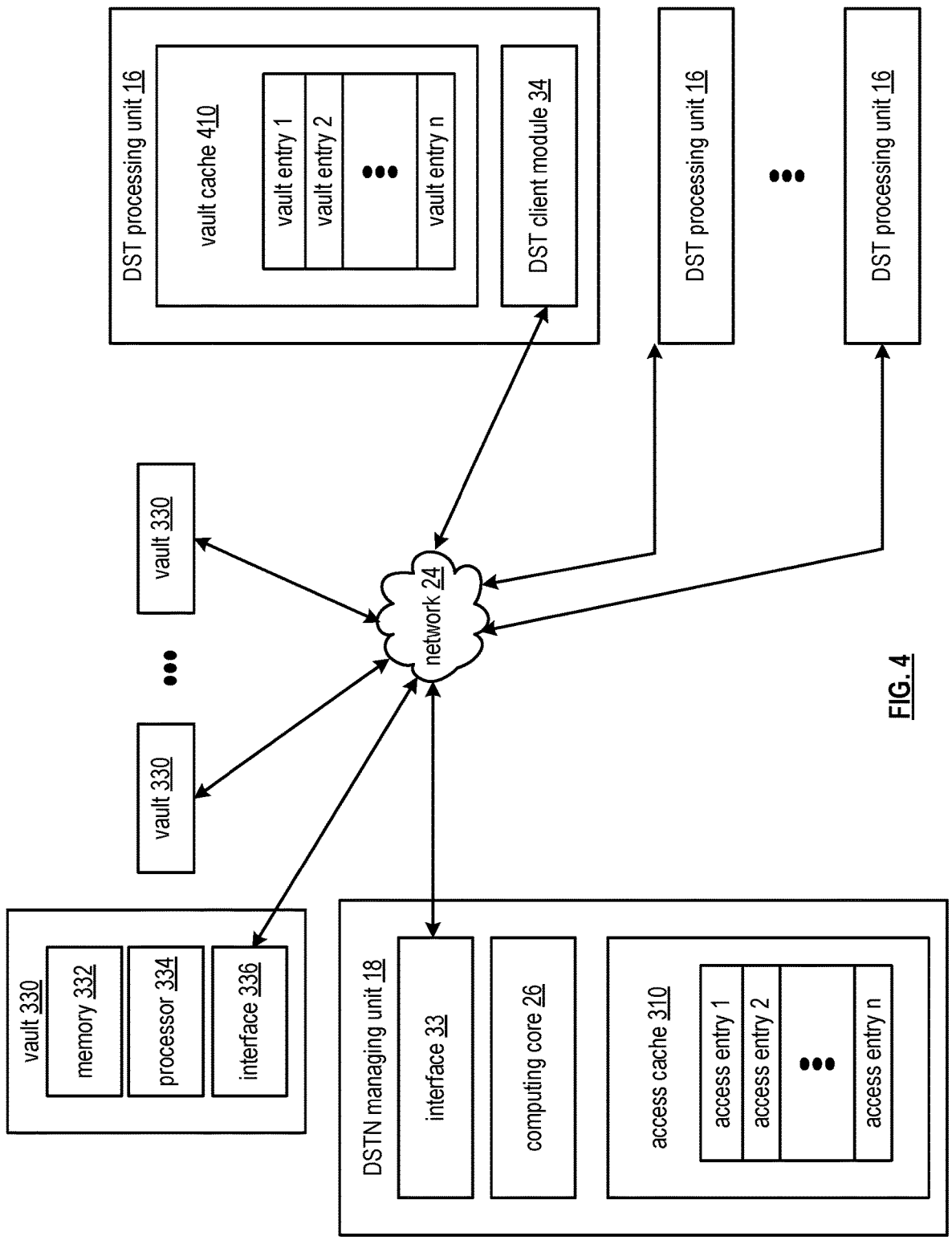
FIG. 4 is a schematic block diagrams of an embodiment of a dispersed storage network (DSN) in accordance with the present invention.

FIG. 4 is a schematic block diagram of another embodiment of a dispersed storage network (DSN) that includes a plurality of distributed storage and task (DST) processing units 16 of FIG. 1, the network 24 of FIG. 1, the DSTN managing unit 18 of FIG. 1, and a plurality of vaults 330. The DSTN managing unit 18 includes the interface 33 of FIG. 1, the computing core 26 of FIG. 1, and an access cache 310, which includes a plurality of access entries 1-*n*. Each of the plurality of DST processing units 16 include the DST client module 34 of FIG. 1 and an access cache 410 that includes a plurality of vault entries 1-*n*. Each vault includes a memory 332, a processor 334, and an interface 336. Each vault can be implemented utilizing the DST execution unit 36 of FIG. 1. The memory 332 can be implemented utilizing main memory 54 of FIG. 2, the processor 334 can be implemented utilizing processing module 50 of FIG. 2, and the interface 336 can be implemented utilizing the client module 34 of FIG. 1. the The DSN functions to route vault access requests.

In various embodiments, the DST processing units also maintain a cache corresponding to vaults accessed by the DST processing unit. The cache can contain metadata for the accessed vaults, which can include namespace ranges, permissions and access controls, quotas, and/or associated storage pools. In various embodiments, the cache can contain access time information such as at least one time stamp. In various embodiments, the cache can be sorted based on the most recent access.

In various embodiments, the requestor can send an instruction to a DST processing unit to remove a cache entry corresponding to a particular vault. For example, after removing a (vault, DST processing unit) pair access entry from its own access cache, the requestor can send an instruction to that particular DST processing unit indicating that the cache entry and associated metadata for that particular vault be removed from the vault cache of that DST processing unit. This may be ideal in some DSNs since a DST processing unit is unlikely to be routed an access request to a vault if that (vault, DST processing unit) pair is not included in an access entry of the requestor's cache. The DST processing unit can remove this metadata to free up space in it's vault cache, and likely will not receive a request to access this metadata again in the near future.

In various embodiments, a DST processing unit can remove metadata corresponding to a particular vault from it's cache without receiving an instruction from the requestor. For example, the DST processing unit's cache may be running low on space and/or the DST processing unit may determine that the particular vault has not been accessed recently. In various embodiments, the DST processing unit can send a notification to the requestor indicating that it has removed metadata corresponding to a particular vault from its cache. In response, the requestor can remove an access entry corresponding to the particular (vault, DST processing unit) pair from its cache. This may be ideal in some DSNs to help ensure that a DST processing unit does not receive access requests for vaults that it has removed from its cache so that the metadata does not need to be retrieved again. This also allows DST processing units the ability to maintain their own vault cache based on their own capacity and/or processing needs while keeping the requestor informed so that future vault access requests can be routed accordingly.

In various embodiments of the processing system of the DSTN managing unit, the operational instructions, when executed by the at least one processor, further cause the processing system to generate an instruction for transmission to a second DST processing unit indicated by the second one of the plurality of access entries, where the instruction indicates that metadata corresponding to a second one of the plurality of vaults be removed from a processing unit cache associated with the DST processing unit, and the second one of the plurality of vaults is indicated by the second one of the plurality of access entries. In various embodiments, a notification is received from a second DST processing unit indicating that metadata corresponding to a second one of the plurality of vaults has been removed from a vault cache associated with the second DST processing unit, where the old access entry data is generated based on the notification, and wherein the second one of the plurality of access entries indicates the second DST processing unit that sent the notification, and wherein the second one of the plurality of access entries indicates the second one of the plurality of vaults indicated in the notification.

FIG. 5 is a flowchart illustrating an example of routing vault access requests. In particular, a method is presented for use in conjunction with one or more functions and features described in conjunction with FIGS. 1-4 is presented for execution by a DSTN managing unit that includes a processor or via another processing system of a dispersed storage network that includes at least one processor and memory that stores instruction that configure the processor or processors to perform the steps described below. Step 502 includes receiving a vault access request indicating a first one of a plurality of vaults. Step 504 includes generating processing unit options data that indicates a set of distributed storage and/or task (DST) processing units based on an access cache that includes a plurality of access entries, where each DST processing unit in the set of DST processing units is indicated in a first one of the plurality of access entries, and the first one of the plurality of access entries further indicates the first one of the plurality of vaults. Step 506 includes selecting a first DST processing unit from the set of DST processing units to execute the vault access request based on the processing unit options data. Step 508 includes generating an instruction that includes the vault access request for transmission to the first DST processing unit via a network. Step 510 includes generating a new access entry that includes a vault identifier indicating the first one of the plurality of vaults indicated by the vault access request and a processor identifier indicating the first DST processing unit. Step 512 includes updating the access cache by adding the new access entry to the access cache.

In various embodiments, the processing unit options data further includes time data indicated by the access cache, and the selecting the first DST processing unit is further based on the time data. In various embodiments, the time data includes a plurality of access time stamps corresponding to each DST processing unit in the set of DST processing units, and the first DST processing unit corresponds to a most recent time stamp. In various embodiments, the processing unit options data further indicates performance data and/or capacity data corresponding to each DST processing unit in the set of DST processing units, and selection of the first DST processing unit is further based on the performance data and/or the capacity data. In various embodiments, the first DST processing unit is selected by performing one of: a digital array processor (DAP) method or a round-robin method on the set of DST processing units.

In various embodiments, the operational instructions, when executed by the at least one processor, further cause the processing system to generating old access entry data. A second one of the plurality of access entries is selected from the access cache based on the old access entry data. The second one of the plurality of access entries is removed from the access cache. In various embodiments, the old access entry data is generated by determining a count of access entries in the access cache and comparing the count to a predefined threshold, and wherein the second one of the plurality of access entries is removed from the access cache when the old access entry data indicates that the count is greater than the predefined threshold. In various embodiments, the old access entry data is generated by comparing an access time stamp indicated by a one of the plurality of access entries to an expiration time, and wherein the second one of the plurality of access entries is removed from the access cache when the old access entry data indicates that the access time stamp is older than the expiration time.

In various embodiments of the processing system of the DSTN managing unit, the operational instructions, when executed by the at least one processor, further cause the processing system to generate an instruction for transmission to a second DST processing unit indicated by the second one of the plurality of access entries, where the instruction indicates that metadata corresponding to a second one of the plurality of vaults be removed from a processing unit cache associated with the DST processing unit, and the second one of the plurality of vaults is indicated by the second one of the plurality of access entries. In various embodiments, a notification is received from a second DST processing unit indicating that metadata corresponding to a second one of the plurality of vaults has been removed from a vault cache associated with the second DST processing unit, where the old access entry data is generated based on the notification, and wherein the second one of the plurality of access entries indicates the second DST processing unit that sent the notification, and wherein the second one of the plurality of access entries indicates the second one of the plurality of vaults indicated in the notification.

The method described above in conjunction with the computing device and the storage units can alternatively be performed by other modules of the dispersed storage network or by other devices. For example, any combination of a first module, a second module, a third module, a fourth module, etc. of the computing device and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

In various embodiments, a non-transitory computer readable storage medium includes at least one memory section that stores operational instructions that, when executed by a processing system of a dispersed storage network (DSN)

that includes a processor and a memory, causes the processing system to receive a vault access request indicating a first one of a plurality of vaults. Processing unit options data that indicates a set of DST processing units is generated based on an access cache that includes a plurality of access entries, where each DST processing unit in the set of DST processing units is indicated in a first one of the plurality of access entries, and where the first one of the plurality of access entries further indicates the first one of the plurality of vaults. A DST processing unit is selected from the set of DST processing units to execute the vault access request based on the processing unit options data. An instruction that includes the vault access request is generated for transmission to the first DST processing unit. A new access entry that includes a vault identifier indicating the first one of the plurality of vaults indicated by the vault access request and a processor identifier indicating the first DST processing unit is generated. The access cache is updated by adding the new access entry to the access cache.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc.

that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a distributed storage and task network (DSTN) managing unit that includes a processor, the method comprises:
   receiving a vault access request indicating a first one of a plurality of vaults;
   generating processing unit options data that indicates a set of distributed storage and task (DST) processing units based on an access cache that includes a plurality of access entries, wherein each of the plurality of access entries indicates a previous access to one of the plurality of vaults by one of the plurality of DST processing units, and wherein a first one of the plurality of access entries indicates a previous accesses to the first one of the plurality of vaults by a first DST processing unit from the set of DST processing units;
   selecting the first DST processing unit from the set of DST processing units to execute the vault access request based on the processing unit options data;
   generating an instruction that includes the vault access request for transmission to the first DST processing unit via a network;
   transmitting the instruction to the first DST processing unit via the network, wherein the first DST processing unit executes the vault access request in response to receiving the instruction by accessing, via the network, a DST execution unit associated with the first one of the plurality of vaults;
   generating a new access entry in response to transmitting the instruction to the first DST processing unit, wherein the new access entry includes a vault identifier indicating the first one of the plurality of vaults indicated by the vault access request, a processor identifier indicating the first DST processing unit, and a time stamp indicating a time that the first DST processing unit accessed the first one of the plurality of vaults;
   updating the access cache by adding the new access entry to the access cache;
   generating old access entry data;
   selecting a second one of the plurality of access entries from the access cache for removal based on the old access entry data;
   removing the second one of the plurality of access entries from the access cache; and
   generating an instruction for transmission to a second DST processing unit indicated by the second one of the plurality of access entries, wherein the instruction indicates that metadata corresponding to a second one of the plurality of vaults be removed from a vault cache associated with the DST processing unit, and wherein the second one of the plurality of vaults is indicated by the second one of the plurality of access entries.

2. The method of claim 1, wherein the processing unit options data further includes time data indicated by the access cache, and wherein the selecting the first DST processing unit is further based on the time data.

3. The method of claim 2, wherein the time data includes a plurality of access time stamps corresponding to each DST processing unit in the set of DST processing units, and wherein the first DST processing unit corresponds to a most recent time stamp.

4. The method of claim 1, wherein the processing unit options data further indicates at least one of: performance data or capacity data corresponding to each DST processing unit in the set of DST processing units, and wherein selection of the first DST processing unit is further based on at least one of: the performance data or the capacity data.

5. The method of claim 1, wherein the first DST processing unit is selected by performing one of: a digital array processor (DAP) method or a round-robin method on the set of DST processing units.

6. The method of claim 1, wherein the old access entry data is generated by determining a plurality of frequencies of access to the plurality of vaults by the plurality of DST processing units.

7. The method of claim 1, wherein the old access entry data is generated by determining a count of access entries in the access cache and comparing the count to a predefined threshold, and wherein the second one of the plurality of access entries is removed from the access cache when the old access entry data indicates that the count is greater than the predefined threshold.

8. The method of claim 1, wherein the old access entry data is generated by comparing an access time stamp indicated by a one of the plurality of access entries to an expiration time, and wherein the second one of the plurality of access entries is removed from the access cache when the old access entry data indicates that the access time stamp is older than the expiration time.

9. The method of claim 1, wherein the old access entry data is generated by determining a count of access entries in the access cache that indicate a second one of the plurality of vaults, and by further comparing the count to a predefined threshold for the second one of the plurality of vaults, and wherein the second one of the plurality of access entries is removed from the access cache when the old access entry data indicates that the count is greater than the predefined threshold.

10. The method of claim 1, further comprising:
   receiving a notification from a third DST processing unit indicating that metadata corresponding to a third one of the plurality of vaults has been removed from a processing unit cache associated with the second DST processing unit, wherein second old access entry data is generated based on the notification, and wherein a third one of the plurality of access entries indicates the second DST processing unit that sent the notification, and wherein the second one of the plurality of access entries indicates the third one of the plurality of vaults indicated in the notification;
  selecting the third one of the plurality of access entries from the access cache for removal based on the second old access entry data; and
  removing the third one of the plurality of access entries from the access cache.

11. A processing system of a distributed storage and task network (DSTN) managing unit comprises:
  at least one processor;
  a memory that stores operational instructions, that when executed by the at least one processor cause the processing system to:
    receive a vault access request indicating a first one of a plurality of vaults;
    generate processing unit options data that indicates a set of distributed storage and task (DST) processing units based on an access cache that includes a plurality of access entries, wherein each of the plurality of access entries indicates a previous access to one of the plurality of vaults by one of the plurality of DST processing units, and wherein a first one of the plurality of access entries indicates a previous accesses to the first one of the plurality of vaults by a first DST processing unit from the set of DST processing units;
    select the first DST processing unit from the set of DST processing units to execute the vault access request based on the processing unit options data;
    generate an instruction that includes the vault access request for transmission to the first DST processing unit via a network;
    transmit the instruction to the first DST processing unit via the network, wherein the first DST processing unit executes the vault access request in response to receiving the instruction by accessing, via the network, a DST execution unit associated with the first one of the plurality of vaults;
    generate a new access entry in response to transmitting the instruction to the first DST processing unit, wherein the new access entry includes a vault identifier indicating the first one of the plurality of vaults indicated by the vault access request, a processor identifier indicating the first DST processing unit, and a time stamp indicating a time that the first DST processing unit accessed the first one of the plurality of vaults;
    update the access cache by adding the new access entry to the access cache;
    generate old access entry data;
    select a second one of the plurality of access entries from the access cache for removal based on the old access entry data;
    remove the second one of the plurality of access entries from the access cache; and
    generate an instruction for transmission to a second DST processing unit indicated by the second one of the plurality of access entries, wherein the instruction indicates that metadata corresponding to a second one of the plurality of vaults be removed from a vault cache associated with the DST processing unit, and wherein the second one of the plurality of vaults is indicated by the second one of the plurality of access entries.

12. The processing system of claim 11, wherein the processing unit options data further includes time data indicated by the access cache, and wherein selecting the first DST processing unit is further based on the time data.

13. The processing system of claim 12, wherein the time data includes a plurality of access time stamps corresponding to each DST processing unit in the set of DST processing units, and wherein the first DST processing unit corresponds to a most recent time stamp.

14. The processing system of claim 11, wherein the processing unit options data further indicates at least one of: performance data or capacity data corresponding to each DST processing unit in the set of DST processing units, and wherein selection of the first DST processing unit is further based on at least one of: the performance data or the capacity data.

15. The processing system of claim 11, wherein the old access entry data is generated by determining a plurality of frequencies of access to the plurality of vaults by the plurality of DST processing units.

16. The processing system of claim 11, wherein the old access entry data is generated by determining a count of access entries in the access cache and comparing the count to a predefined threshold, and wherein the second one of the plurality of access entries is removed from the access cache when the old access entry data indicates that the count is greater than the predefined threshold.

17. The processing system of claim 11, wherein the old access entry data is generated by comparing an access time stamp indicated by a one of the plurality of access entries to an expiration time, and wherein the second one of the plurality of access entries is removed from the access cache when the old access entry data indicates that the access time stamp is older than the expiration time.

18. The processing system of claim 11, wherein the old access entry data is generated by determining a count of access entries in the access cache that indicate a second one of the plurality of vaults, and by further comparing the count to a predefined threshold for the second one of the plurality of vaults, and wherein the second one of the plurality of access entries is removed from the access cache when the old access entry data indicates that the count is greater than the predefined threshold.

19. The processing system of claim 11, wherein the operational instructions, when executed by the at least one processor, further cause the processing system to:
  receive a notification from a third DST processing unit indicating that metadata corresponding to a third one of the plurality of vaults has been removed from a processing unit cache associated with the second DST processing unit, wherein second old access entry data is generated based on the notification, and wherein a third one of the plurality of access entries indicates the second DST processing unit that sent the notification, and wherein the second one of the plurality of access entries indicates the third one of the plurality of vaults indicated in the notification;
  select the third one of the plurality of access entries from the access cache for removal based on the second old access entry data; and
  remove the third one of the plurality of access entries from the access cache.

20. A non-transitory computer readable storage medium comprises:

at least one memory section that stores operational instructions that, when executed by a processing system of a dispersed storage network (DSN) that includes a processor and a memory, causes the processing system to:
receive a vault access request indicating a first one of a plurality of vaults;
generate processing unit options data that indicates a set of distributed storage and task (DST) processing units based on an access cache that includes a plurality of access entries, wherein each of the plurality of access entries indicates a previous access to one of the plurality of vaults by one of the plurality of DST processing units, and wherein a first one of the plurality of access entries indicates a previous accesses to the first one of the plurality of vaults by a first DST processing unit from the set of DST processing units;
select the first DST processing unit from the set of DST processing units to execute the vault access request based on the processing unit options data;
generate an instruction that includes the vault access request for transmission to the first DST processing unit via a network;
transmit the instruction to the first DST processing unit via the network, wherein the first DST processing unit executes the vault access request in response to receiving the instruction by accessing, via the network, a DST execution unit associated with the first one of the plurality of vaults;
generate a new access entry in response to transmitting the instruction to the first DST processing unit, wherein the new access entry includes a vault identifier indicating the first one of the plurality of vaults indicated by the vault access request, a processor identifier indicating the first DST processing unit, and a time stamp indicating a time that the first DST processing unit accessed the first one of the plurality of vaults;
update the access cache by adding the new access entry to the access cache;
generate old access entry data;
select a second one of the plurality of access entries from the access cache for removal based on the old access entry data;
remove the second one of the plurality of access entries from the access cache; and
generate an instruction for transmission to a second DST processing unit indicated by the second one of the plurality of access entries, wherein the instruction indicates that metadata corresponding to a second one of the plurality of vaults be removed from a vault cache associated with the DST processing unit, and wherein the second one of the plurality of vaults is indicated by the second one of the plurality of access entries.

* * * * *